United States Patent
Chang et al.

(10) Patent No.: US 10,313,020 B2
(45) Date of Patent: *Jun. 4, 2019

(54) OPTICAL TRANSMISSION SYSTEM AND RELATED REMOTE OPTICALLY PUMPED AMPLIFIER (ROPA) AND METHOD

(71) Applicant: Neptune Subsea IP Limited, London (GB)

(72) Inventors: Do-Il Chang, Allen, TX (US); Philippe Andre Perrier, Plano, TX (US); Herve A. Fevrier, Miami, FL (US)

(73) Assignee: Neptune Subsea IP Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,296

(22) Filed: Nov. 1, 2017

(65) Prior Publication Data

US 2018/0069637 A1    Mar. 8, 2018

Related U.S. Application Data (63) Continuation of application No. 15/060,973, filed on Mar. 4, 2016, now Pat. No. 9,838,136.

(Continued)

(51) Int. Cl.
*H04J 14/00* (2006.01)
*H04B 10/564* (2013.01)
(Continued)

(52) U.S. Cl.
CPC ....... *H04B 10/564* (2013.01); *H01S 3/06758* (2013.01); *H01S 3/094* (2013.01);
(Continued)

(58) Field of Classification Search
CPC ... H04B 10/2916; H04B 10/564; H01S 3/302; H01S 3/06754; H01S 3/094096;
(Continued)

(56) References Cited

U.S. PATENT DOCUMENTS

| | | | |
|---|---|---|---|
| 6,624,926 B1 | 9/2003 | Hayashi et al. | |
| 7,672,042 B2 * | 3/2010 | Zhou ................... | H01S 3/06754 359/334 |

(Continued)

FOREIGN PATENT DOCUMENTS

EP    1519502 A1    3/2005

OTHER PUBLICATIONS

International Preliminary Report of Patentability for International Patent Application No. PCT/US2016/020928 dated Sep. 21, 2017, 8 pages.

(Continued)

*Primary Examiner* — Don N Vo (57) ABSTRACT

An apparatus includes a remote optically pumped amplifier (ROPA). The ROPA includes a bypass filter configured to receive an optical signal and first pump power and to separate the optical signal and the first pump power. The ROPA also includes an amplifier configured to receive the optical signal from the bypass filter and to amplify the optical signal. The ROPA further includes an optical combiner/multiplexer configured to receive the first pump power from the bypass filter, receive at least second and third pump powers, combine at least two of the first, second and third pump powers, and provide different pump powers or combinations of pump powers to different locations within the ROPA to feed the amplifier.

21 Claims, 7 Drawing Sheets

Related U.S. Application Data (60) Provisional application No. 62/129,610, filed on Mar. 6, 2015.

(51) Int. Cl.
*H01S 3/094* (2006.01)
*H04B 10/291* (2013.01)
*H01S 3/067* (2006.01)
*H01S 3/30* (2006.01)

(52) U.S. Cl.
CPC .. *H01S 3/094061* (2013.01); *H01S 3/094096* (2013.01); *H01S 3/302* (2013.01); *H04B 10/2916* (2013.01)

(58) Field of Classification Search
CPC .............. H01S 3/1312; H01S 3/094011; H01S 3/06758; H01S 3/094061; H01S 3/094
USPC .......................................................... 398/43
See application file for complete search history.

(56) References Cited

U.S. PATENT DOCUMENTS

| | | |
|---|---|---|
| 2002/0027704 A1 | 3/2002 | Kobayashi et al. |
| 2003/0174390 A1 | 9/2003 | Kakui |
| 2004/0190120 A1 | 9/2004 | Torii et al. |
| 2006/0087723 A1 | 4/2006 | Takeyama et al. |
| 2008/0199181 A1 | 8/2008 | Nakano et al. |
| 2014/0139908 A1* | 5/2014 | Liu .................... H01S 3/06758 359/341.3 |

OTHER PUBLICATIONS

International Search Report and Written Opinion of the International Searching Authority for International Patent Application No. PCT/US2016/020928 dated Jul. 26, 2016, 11 pages.

* cited by examiner

OPTICAL TRANSMISSION SYSTEM AND RELATED REMOTE OPTICALLY PUMPED AMPLIFIER (ROPA) AND METHOD

CROSS-REFERENCE TO RELATED APPLICATION AND PRIORITY CLAIM

This application is a continuation of U.S. patent application Ser. No. 15/060,973 filed on Mar. 4,2016, which claims priority under 35 U.S.C. § 119(e) to U.S. Provisional Patent Application No. 62/129,610 filed on Mar. 6, 2015. Both of these patent application are hereby incorporated by reference in their entirety.

TECHNICAL FIELD

This disclosure relates generally to optical transmission systems. More specifically, this disclosure relates to an optical transmission system and a related remote optically pumped amplifier (ROPA) and method.

BACKGROUND

Optical communication networks are often used to transport large amounts of data over long distances very quickly. At present, sophisticated optical communication networks are capable of transmitting tens of trillions of bits of information per second over a single optical fiber spanning many hundreds of kilometers. Optical communication networks generally exceed the bandwidth capabilities of copper networks. As a result, optical networks are often part of wireline telecommunication networks and are often used to provide optical backbones at the cores of the telecommunication networks.

SUMMARY

This disclosure provides an optical transmission system and a related remote optically pumped amplifier (ROPA) and method.

In a first embodiment, an apparatus includes a ROPA. The ROPA includes a bypass filter configured to receive an optical signal and first pump power and to separate the optical signal and the first pump power. The ROPA also includes an amplifier configured to receive the optical signal from the bypass filter and to amplify the optical signal. The ROPA further includes an optical combiner/multiplexer configured to receive the first pump power from the bypass filter, receive at least second and third pump powers, combine at least two of the first, second and third pump powers, and provide different pump powers or combinations of pump powers to different locations within the ROPA to feed the amplifier.

In a second embodiment, a system includes an optical communication link having a ROPA. The ROPA includes a bypass filter configured to receive an optical signal and first pump power and to separate the optical signal and the first pump power. The ROPA also includes an amplifier configured to receive the optical signal from the bypass filter and to amplify the optical signal. The ROPA further includes an optical combiner/multiplexer configured to receive the first pump power from the bypass filter, receive at least second and third pump powers, combine at least two of the first, second and third pump powers, and provide different pump powers or combinations of pump powers to different locations within the ROPA to feed the amplifier.

In a third embodiment, a method includes receiving an optical signal and first pump power at a ROPA. The method also includes separating the optical signal and the first pump power using a bypass filter of the ROPA. The method further includes amplifying the optical signal using an amplifier of the ROPA. The method also includes receiving the first pump power from the bypass filter and at least second and third pump powers at an optical combiner/multiplexer of the ROPA. In addition, the method includes combining at least two of the first, second and third pump powers and providing different pump powers or combinations of pump powers to different locations within the ROPA to feed the amplifier.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 14, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

This disclosure provides various architectures for remote optically pumped amplifiers (ROPAs) and optical transmission systems that utilize such ROPAs. In some embodiments, these ROPAs and optical transmission systems support the use of one or more unrepeatered optical communication links. An "unrepeatered" optical communication link refers to an optical link in which active optical repeaters are not used. In contrast, a "repeatered" optical communication link refers to an optical link in which one or more active optical repeaters are used at one or more in-line optical amplification sites. One aspect differentiating repeatered and unrepeatered optical communication links is the fact that active optical repeaters need a source of electrical power, so a copper conductor is typically used in a cable for a repeatered communication link in order to electrically power optical amplifiers within the active optical repeaters. Unrepeatered optical cables do not have the ability to supply electrical power to in-line equipment. Instead, conventional unrepeatered optical networks often use ROPAs to amplify optical signals as the optical signals traverse the optical links. Each ROPA is not electrically powered locally but is rather optically pumped from one end of a communication link, hence the terminology "remote optically pumped" amplifier.

Unrepeatered transmission systems have a number of potential applications including submarine and terrestrial optical communications, such as in optical fiber networks embedded into power cable systems of power utilities. In some instances, a ROPA is used on only the "receive side" of an unrepeatered optical link. In other instances, ROPAs are used on both the "transmit side" and the "receive side" of an unrepeatered optical link. The "transmit side" refers to the portion of an optical link closer to a transmitting end-point or terminal, and the "receive side" refers to the portion of an optical link closer to a receiving end-point or terminal. When optical fibers are used in pairs (one for transmission in one direction and another for transmission in the opposite direction), the ROPA on the transmit side of one optical fiber can be placed in the same housing as the ROPA on the receive side of the other optical fiber.

While often described below as being used in a single-span unrepeatered optical transmission system, the principles described in this patent document are not limited to such systems. The principles described in this patent document could find use in other systems, such as a multi-span optical transmission system in which multiple ROPAs are used in-line with multiple spans of optical fibers or in amplified optical transmission systems. In general, the principles described in this patent document can be used in any system where there is an optical span that is long and lossy or where remote optical amplification is otherwise needed or desired in an optical span. The use of one or more ROPAs in these types of optical links allows amplification of optical signals without the need for regeneration points.

Figure 1:
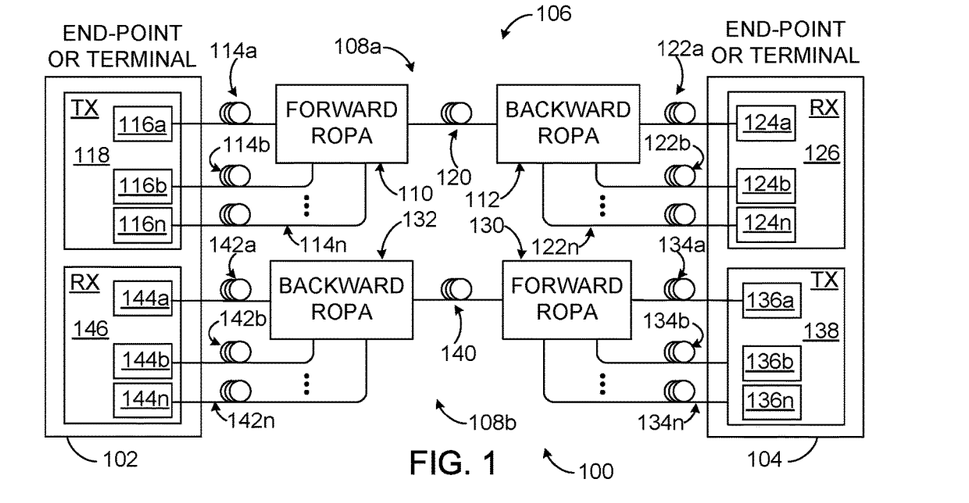
FIG. 1 illustrates an example optical transmission system according to this disclosure.

FIG. 1 illustrates an example optical transmission system 100 according to this disclosure. As shown in FIG. 1, the system 100 includes a first end-point or terminal 102, a second end-point or terminal 104, and at least one optical communication link 106. The end-points or terminals 102 and 104 communicate with one another via the optical communication link 106 to exchange data. Each end-point or terminal 102 and 104 also typically communicates with external devices or systems. Each end-point or terminal 102 and 104 generally denotes any suitable device or system that communicates optically. Each end-point or terminal 102 and 104 could, for example, denote components on opposite sides of an optical communication link 106 that can span hundreds of kilometers over land or under water.

The optical communication link 106 here denotes a bi-directional optical link. The optical communication link 106 includes a first optical link 108a supporting optical transmissions from the first end-point or terminal 102 to the second end-point or terminal 104 and a second optical link 108b supporting optical transmissions from the second end-point or terminal 104 to the first end-point or terminal 102. The optical links 108a and 108b are often said to denote a "fiber pair." Note that while two optical links in one fiber pair are shown in FIG. 1, any number of optical links or fiber pairs could be used between the end-points or terminals 102 and 104. For ease of explanation, the structure of the optical link 108a is described in greater detail below, and the optical link 108b could have the same or similar configuration (although this need not be the case).

As shown here, the optical link 108a includes both a forward ROPA 110 and a backward ROPA 112. Each ROPA 110 and 112 denotes an optical amplifier that operates using pump power provided to the ROPA 110 and 112 through the optical link 108a. The ROPAs 110 and 112 need not be provided electrical power through a copper or other conductor in the optical link 108a. The ROPA 110 is referred to as a "forward" ROPA because the pump power used by the ROPA 110 flows from the end-point or terminal 102 to the ROPA 110 in the same direction as optical signals sent from the end-point or terminal 102 to the end-point or terminal 104. In contrast, the ROPA 112 is referred to as a "backward" ROPA because the pump power used by the ROPA 112 flows from the end-point or terminal 104 to the ROPA 112 in an opposite direction as the optical signals sent from the end-point or terminal 102 to the end-point or terminal 104.

The ROPA 110 is coupled to the end-point or terminal 102 by three or more optical fibers 114a-114n. Optical signals containing data sent from the end-point or terminal 102 to the end-point or terminal 104 travel over the optical fiber 114a to the ROPA 110. Pump power for the ROPA 110 is sent from various pump sources 116a-116n in an optical transmitter 118 of the end-point or terminal 102 through the optical fibers 114a-114n. The ROPA 110 operates to amplify the optical signals received over the optical fiber 114a using the pump power received over the optical fibers 114a-114n. As described in more detail below, the ROPA 110 implements spatial and wavelength multiplexing to more effectively use the pump power from the pump sources 116a-116n in order to amplify the optical signals traveling through the optical link 108a.

The ROPA 110 includes any suitable remotely-pumped structure for optically amplifying signals. Each of the optical fibers 114a-114n includes any suitable optical fiber for transporting optical signals or pump power. In some instances, each of the optical fibers 114a-114n could have a length of over 100 or 120 kilometers. Each of the pump sources 116a-116n includes any suitable structure for providing pump power to a remote optical amplifier. Each of the pump sources 116a-116n could, for instance, denote one or more lasers. The optical transmitter 118 includes any suitable structure for generating optical signals for transmission over an optical link.

An optical fiber 120 couples the forward ROPA 110 and the backward ROPA 112. The optical fiber 120 includes any suitable optical fiber for transporting optical signals. In some instances, the optical fiber 120 could have a length of over 500 or 600 kilometers.

The backward ROPA 112 operates in a similar manner as the forward ROPA 110, but the direction that the pump power travels is reversed. The ROPA 112 is coupled to the end-point or terminal 104 by three or more optical fibers 122a-122n. Optical signals containing data sent from the end-point or terminal 102 to the end-point or terminal 104 travel over the optical fiber 122a to the end-point or terminal 104. Pump power for the ROPA 112 is sent from various pump sources 124a-124n in an optical receiver 126 of the end-point or terminal 104 through the optical fibers 122a-122n. The ROPA 112 operates to amplify the optical signals received over the optical fiber 120 using the pump power received over the optical fibers 122a-122n. As described in more detail below, the ROPA 112 implements spatial and wavelength multiplexing to more effectively use the pump power from the pump sources 124a-124n in order to amplify the optical signals traveling through the optical link 108a.

The ROPA 112 includes any suitable remotely-pumped structure for optically amplifying signals. Each of the optical fibers 122a-122n includes any suitable optical fiber for transporting optical signals or pump power. In some instances, each of the optical fibers 122a-122n could have a length of over 150 kilometers. Each of the pump sources 124a-124n includes any suitable structure for providing pump power to a remote optical amplifier. Each of the pump sources 124a-124n could, for instance, denote one or more lasers. The optical receiver 126 includes any suitable structure for processing optical signals received over an optical link.

Communications from the end-point or terminal 104 to the end-point or terminal 102 over the optical link 108b could occur in the same or similar manner. The optical link 108b includes a forward ROPA 130 and a backward ROPA 132. The forward ROPA 130 is coupled to the end-point or terminal 104 by three or more optical fibers 134a-134n, and pump sources 136a-136n of an optical transmitter 138 provide pump power to the ROPA 130. The forward ROPA 130 is coupled to the backward ROPA 132 by an optical fiber 140. The backward ROPA 132 is coupled to the end-point or terminal 102 by three or more optical fibers 142a-142n, and pump sources 144a-144n of an optical receiver 146 provide pump power to the ROPA 132.

Each ROPA 130 and 132 includes any suitable remotely-pumped structure for optically amplifying signals. In some instances, the ROPAs 110 and 132 could be placed in a common housing, and the ROPAs 112 and 130 could be placed in a common housing. Each of the optical fibers 134a-134n, 142a-142n includes any suitable optical fiber for transporting optical signals or pump power. In some instances, each of the optical fibers 134a-134n could have a length of over 100 or 120 kilometers, and each of the optical fibers 142a-142n could have a length of over 150 kilometers. Each of the pump sources 136a-136n, 144a-144n includes any suitable structure for providing pump power to a remote optical amplifier, such as one or more lasers. The optical transmitter 138 includes any suitable structure for generating optical signals for transmission over an optical link. The optical receiver 146 includes any suitable structure for processing optical signals received over an optical link.

In some embodiments, Raman amplification can occur in the optical links 114a, 122a, 134a, 142a using pump power from the pump sources 116a, 124a, 136a, 144a. Any residual pump power sent over the optical links 114a, 122a, 134a, 142a and received at the ROPAs 110, 112, 130, 132 could be referred to as a "remnant" of the pump power. As described in more detail below, the spatial and wavelength multiplexing provided by the ROPAs 110, 112, 130, 132 can involve (i) any remnant pump powers received over the optical links 114a, 122a, 134a, 142a and (ii) at least two additional pump powers received over the optical links 114b-114n, 122b-122n, 134b-134n, 142b-142n. In some embodiments, the Raman amplification provided in the communication link 106 could denote first-order Raman amplification or fractional-order Raman amplification but not multi-order Raman amplification. This means that optical signals can be directly pumped with a shift of one Raman order or with a fractional shift of one Raman order. A system capable of providing fractional-order Raman amplification is described in U.S. Pat. No. 7,567,593, which is hereby incorporated by reference in its entirety.

Although FIG. 1 illustrates one example of an optical transmission system 100, various changes may be made to FIG. 1. For example, FIG. 1 is meant to illustrate one example environment in which certain ROPA architectures could be used. There are a number of single-span and multi-span configurations that could benefit from the use of these ROPA architectures, and FIG. 1 does not limit this disclosure to use of a ROPA architecture in any specific system. One example of a multi-span configuration containing ROPAs is disclosed in U.S. Patent Publication No. 2015/0270676, which is hereby incorporated by reference in its entirety. Also, while shown as including both forward and backward ROPAs 110, 112, 130, 132 on each optical link 108a-108b, an optical link could include only one of these ROPAs. Further, there is no requirement that the same design be used for the optical links 108a-108b. In addition, any specific ROPA architectures discussed below could be replicated and used in any number of optical links and fiber pairs between components of the optical transmission system 100 or other optical transmission system.

Figure 2:
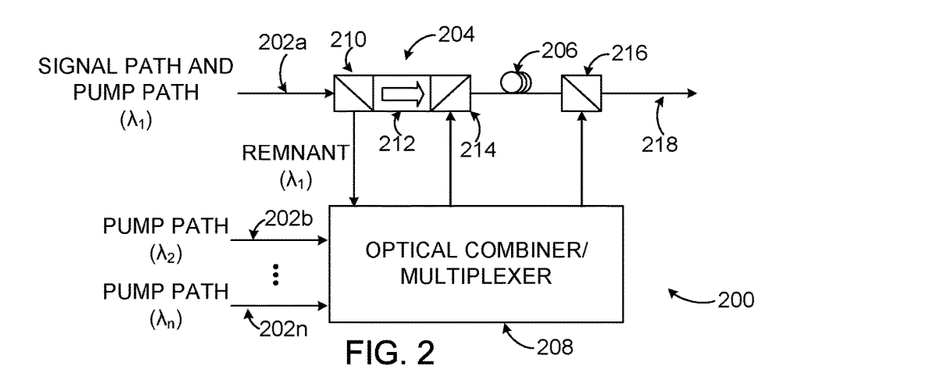
FIGS. 2 and 3 illustrate example architectures of remote optically pumped amplifiers (ROPAs) for use in optical transmission systems according to this disclosure.
Figure 3:
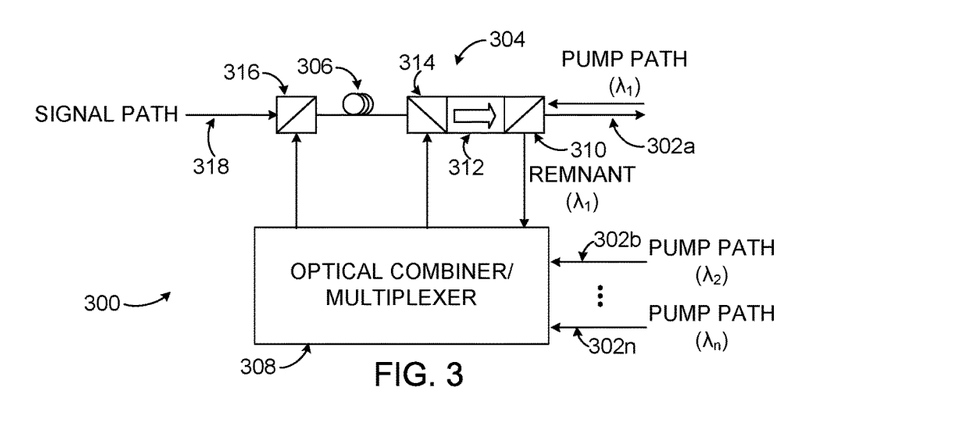

FIGS. 2 and 3 illustrate example architectures of ROPAs for use in optical transmission systems according to this disclosure. For ease of explanation, the ROPA architectures in FIGS. 2 and 3 may be described as operating in the optical transmission system 100 of FIG. 1. However, these ROPA architectures could be used in any other suitable system.

In FIG. 2, a ROPA architecture 200 for a forward ROPA is illustrated. The ROPA architecture 200 here includes at least three optical paths 202a-202n, which denote the optical paths through which optical signals and pump power flow to the forward ROPA. The optical paths 202a-202n could, for instance, denote or be coupled to the optical fibers 114a-114n or 134a-134n in FIG. 1.

The optical path 202a transports optical signals being communicated between the end-points or terminals 102 and 104 to the forward ROPA. The optical signals could denote any suitable optical signals. In some embodiments, the optical signals denote Wavelength Division Multiplexing (WDM) or Dense Wavelength Division Multiplexing (DWDM) signals. These types of optical signals generally denote signals formed by wavelength multiplexing of optical carriers at different frequencies. In the most basic case, there may be only one optical carrier for a signal, but there are generally multiple optical carriers in WDM or DWDM signals.

The optical paths 202a-202n also transport pump power to the forward ROPA for use in amplifying the optical signals. Each pump power traveling over the optical paths 202a-202n has an associated wavelength or wavelength range denoted $\lambda_{\{1-n\}}$. Although the different pump powers in FIG. 2 are associated with wavelengths or wavelength ranges $\lambda_1$ through $\lambda_n$, this does not necessarily require that each optical path 202a-202n transport pump power at a different wavelength or wavelength range. It is possible for some of the pump powers transported over different optical paths 202a-202n to partially or completely overlap in wavelength, as long as there are pump powers having at least three distinct wavelengths transported over the optical paths 202a-202n.

As noted above, the pump power sent over the optical fiber 114a, 134a could be used for Raman amplification. As a result, only part of the pump power sent over the optical fiber 114a, 134a (the "remnant" pump power) may be received by the forward ROPA over the optical path 202a.

The ROPA architecture 200 includes a bypass hybrid filter 204, a fiber amplifier 206, and an optical combiner/multiplexer unit 208. The hybrid filter 204 generally operates to separate the optical signals received over the optical path 202a from any remnant pump power received over the optical path 202a, provide the optical signals to the fiber amplifier 206, and provide the remnant pump power to the optical combiner/multiplexer unit 208. The fiber amplifier 206 generally operates to amplify optical signals using pump power received at one or more locations of the ROPA architecture 200. The optical combiner/multiplexer unit 208 supports both spatial and wavelength multiplexing of the pump powers and the ability to provide the pump powers to different locations within the ROPA architecture 200.

In this example, the hybrid filter 204 is formed using an optical demultiplexer 210, an optical isolator 212, and an optical multiplexer 214. There is an additional optical multiplexer 216 following the fiber amplifier 206, which generates output signals on an optical path 218. The optical path 218 could, for example, denote or be coupled to the optical fiber 120 or 140 in FIG. 1.

The optical demultiplexer 210 operates to separate the optical signals from the remnant pump power received over the optical path 202a. The optical demultiplexer 210 provides the optical signals to the optical multiplexer 214 via the optical isolator 212, and the optical demultiplexer 210 provides the remnant pump power to the optical combiner/multiplexer unit 208. The optical isolator 212 operates to isolate the remnant pump power from passing through to the optical multiplexer 214. The optical multiplexers 214 and 216 operate to combine the optical signals with pump powers provided by the optical combiner/multiplexer unit 208 onto common optical fibers. The optical multiplexer 214 feeds the fiber amplifier 206 in the forward direction, and the optical multiplexer 216 feeds the fiber amplifier 206 in the backward direction. The result here is that different pump powers can travel at least partially through the ROPA architecture 200 along paths that are parallel with the optical signals being amplified, and the pump powers can be fed in different directions to the fiber amplifier 206.

The optical demultiplexer 210 includes any suitable structure for separating optical signals and pump powers. The optical isolator 212 includes any suitable structure for isolating optical signals and pump powers. Each of the optical multiplexers 214 and 216 includes any suitable structure for combining optical signals and pump powers. In some embodiments, a ROPA with a bypass component can be implemented as disclosed in U.S. patent application Ser. No. 13/214,010, which is hereby incorporated by reference in its entirety.

The fiber amplifier 206 denotes any suitable optical fiber structure configured to amplify optical signals. In some embodiments, the fiber amplifier 206 denotes an Erbium-doped fiber amplifier, although other suitable fiber amplifiers or other types of amplifiers could also be used.

The optical combiner/multiplexer unit 208 operates to redirect and selectively combine the pump powers received from the optical paths 202a-202n and to provide the pump powers to the optical multiplexers 214 and 216. As noted above, the optical combiner/multiplexer unit 208 provides both wavelength and spatial multiplexing of the pump powers. Wavelength multiplexing is accomplished by combining pump powers at different wavelengths or wavelength ranges. Spatial multiplexing is accomplished by providing pump powers to different locations within the ROPA architecture 200, such as by providing different pump powers to different optical multiplexers 214 and 216. Various implementations of the optical combiner/multiplexer unit 208 are described below.

The optical combiner/multiplexer unit 208 can be coupled to each of the components 210, 214, 216 via an optical fiber. Each of the locations where the optical combiner/multiplexer unit 208 can provide pump powers (to the optical multiplexers 214 and 216 in this example) may be referred to as a port. The optical combiner/multiplexer unit 208 therefore provides spatial and wavelength multiplexing between its three input optical fibers and the two ports. Note that while the optical combiner/multiplexer unit 208 is shown here as providing pump power to two locations, there could be additional locations where pump power can be provided. For example, pump power could be injected into different segments of the fiber amplifier 206.

In FIG. 3, a ROPA architecture 300 for a backward ROPA is illustrated. The ROPA architecture 300 here includes at least three optical paths 302a-302n, which denote the optical paths through which pump power flows to the backward ROPA and optical signals flow from the backward ROPA. The optical paths 302a-302n could, for instance, denote or be coupled to the optical fibers 122a-122n or 142a-142n in FIG. 1.

The optical path 302a transports optical signals being communicated between the end-points or terminals 102 and 104 from the backward ROPA to the end-point or terminal 104. The optical signals could denote any suitable optical signals, such as WDM or DWDM signals. The optical paths 302a-302n also transport pump power to the backward ROPA for use in amplifying the optical signals. The pump power traveling over the optical path 302a travels in the opposite direction as the optical signals. Each pump power traveling over the optical paths 302a-302n has an associated wavelength or wavelength range $\lambda_{\{1-n\}}$. Again, although the different pump powers in FIG. 3 are associated with wavelengths or wavelength ranges $\lambda_1$ through $\lambda_n$, this does not necessarily require that each optical path 302a-302n transport pump power at a different wavelength or wavelength range. It is possible for some of the pump powers transported over different optical paths 302a-302n to partially or completely overlap in wavelength, as long as there are pump powers having at least three distinct wavelengths transported over the optical paths 302a-302n.

As noted above, the pump power sent over the optical fiber 122a, 142a could be used for Raman amplification. As a result, only a remnant of the pump power sent over the optical fiber 122a, 142a may be received by the backward ROPA over the optical path 302a.

The ROPA architecture 300 includes a bypass hybrid filter 304, a fiber amplifier 306, and an optical combiner/multiplexer unit 308. The hybrid filter 304 generally operates to separate optical signals received over an optical path 318 from any remnant pump power received over the optical path 302a, provide the optical signals to the optical path 302a, and provide the remnant pump power to the optical combiner/multiplexer unit 308. The fiber amplifier 306 generally operates to amplify optical signals using pump power received at one or more locations of the ROPA architecture 300. The optical combiner/multiplexer unit 308 supports both spatial and wavelength multiplexing of the pump powers and the ability to provide the pump powers to different locations within the ROPA architecture 300.

In this example, the hybrid filter 304 is formed using an optical demultiplexer 310, an optical isolator 312, and an optical multiplexer 314. There is an additional optical multiplexer 316 preceding the fiber amplifier 306, which receives optical signals on the optical path 318. The optical path 318 could, for example, denote or be coupled to the optical fiber 120 or 140 in FIG. 1.

The optical demultiplexer 310 operates to separate the optical signals from the remnant pump power received over the optical path 302a. The optical demultiplexer 310 provides the optical signals to the optical path 302a, and the optical demultiplexer 310 provides the remnant pump power to the optical combiner/multiplexer unit 308. The optical isolator 312 operates to isolate the remnant pump power from passing through to the optical multiplexer 314. The optical multiplexers 314 and 316 operate to combine the optical signals with pump powers provided by the optical combiner/multiplexer unit 308 onto common optical fibers. The optical multiplexer 316 feeds the fiber amplifier 306 in the forward direction, and the optical multiplexer 314 feeds the fiber amplifier 306 in the backward direction. The result here is that different pump powers can travel at least partially through the ROPA architecture 300 along paths that are parallel with the optical signals being amplified, and the pump powers can be fed in different directions to the fiber amplifier 306.

The optical demultiplexer 310 includes any suitable structure for separating optical signals and pump powers. The optical isolator 312 includes any suitable structure for isolating optical signals and pump powers. Each of the optical multiplexers 314 and 316 includes any suitable structure for combining optical signals and pump powers. Again, in some embodiments, a ROPA with a bypass component can be implemented as disclosed in U.S. patent application Ser. No. 13/314,010.

The fiber amplifier 306 denotes any suitable optical fiber structure configured to amplify optical signals. In some embodiments, the fiber amplifier 306 denotes an Erbium-doped fiber amplifier, although other suitable fiber amplifiers or other types of amplifiers could also be used.

The optical combiner/multiplexer unit 308 operates to redirect and selectively combine the pump powers received from the optical paths 302a-302n and to provide the pump powers to the optical multiplexers 314 and 316. Again, the optical combiner/multiplexer unit 308 provides both wavelength and spatial multiplexing of the pump powers. Various implementations of the optical combiner/multiplexer unit 308 are described below.

The optical combiner/multiplexer unit 308 can be coupled to each of the components 310, 314, 316 via an optical fiber. Each of the locations where the optical combiner/multiplexer unit 308 can provide pump powers (to the optical multiplexers 314 and 316 in this example) may be referred to as a port. The optical combiner/multiplexer unit 308 therefore provides spatial and wavelength multiplexing between its three input optical fibers and the two ports. Note that while the optical combiner/multiplexer unit 308 is shown here as providing pump power to two locations, there could be additional locations where pump power can be provided. For example, pump power could be injected into different segments of the fiber amplifier 306.

In FIGS. 2 and 3, the forward and backward ROPA architectures 200 and 300 allow different pump powers to be both spatially and wavelength multiplexed within the ROPAs. The bypass components allow the optical signals being amplified to pass, while the pump powers can be provided to appropriate locations within the ROPAs to support more efficient and effective amplification of the optical signals. This can be accomplished without requiring the optical fibers that carry only pump powers to extend across the complete span between the end-points or terminals 102 and 104. Rather, each optical fiber that carries only pump power may extend only to the closest ROPA.

Although FIGS. 2 and 3 illustrate examples of architectures 200, 300 of ROPAs for use in optical transmission systems, various changes may be made to FIGS. 2 and 3. For example, the numbers of optical paths carrying pump powers can vary as needed or desired. Also, the numbers of inputs and outputs of the various optical combiner/multiplexer units can vary as needed or desired.

FIGS. 4 through 7 illustrate specific examples of architectures of ROPAs for use in optical transmission systems according to this disclosure. In particular, FIGS. 4 through 7 illustrate ROPAs with specific implementations of the optical combiner/multiplexer units 208 and 308 described above. For ease of explanation, the ROPA architectures in FIGS. 4 through 7 may be described as operating in the optical transmission system 100 of FIG. 1. However, these ROPA architectures could be used in any other suitable system.

Figure 4:
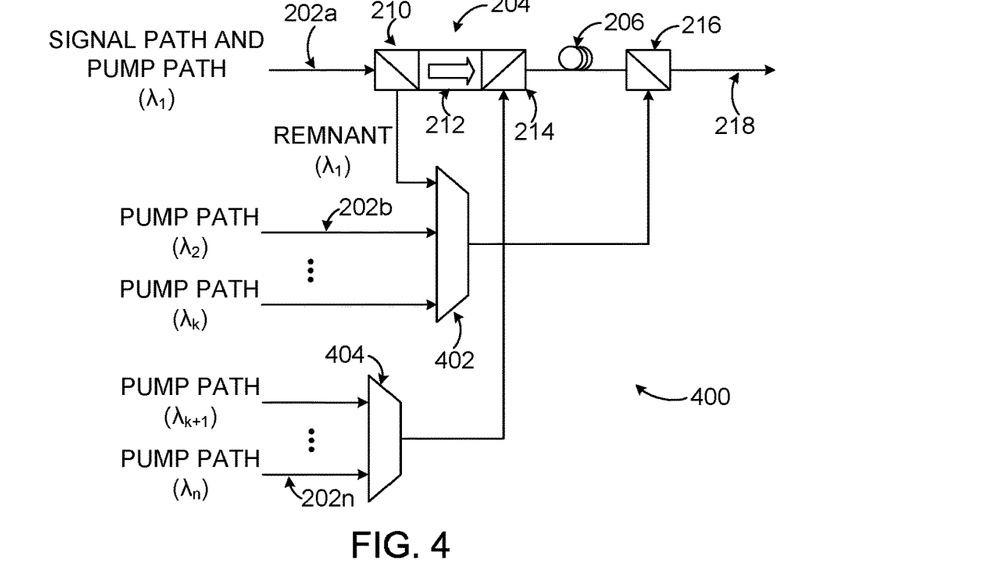
FIGS. 4 through 7 illustrate specific examples of architectures of ROPAs for use in optical transmission systems according to this disclosure.

As shown in FIG. 4, a forward ROPA architecture 400 includes various components 202a-202n, 204, 206, 210, 212, 214, 216, 218 described above with respect to FIG. 2. The forward ROPA architecture 400 also implements the optical combiner/multiplexer unit 208 using two pump combiners 402 and 404. Each pump combiner 402 and 404 denotes any suitable pump combiner, multiplexer, or other structure(s) configured to combine pump powers. While each pump combiner 402 and 404 is shown as a single component in FIG. 4, each pump combiner 402 and 404 could be implemented using multiple devices to perform the desired combining function.

In this example, the pump combiner 402 receives the remnant of the pump power from the optical path 202a and pump powers from a subset of the remaining optical paths 202b-202n. The pump combiner 404 receives pump powers from another subset of the remaining optical paths 202b-202n. The pump combiner 404 feeds pump power(s) to the optical multiplexer 214, while the pump combiner 402 feeds pump power(s) to the optical multiplexer 216.

Figure 5:
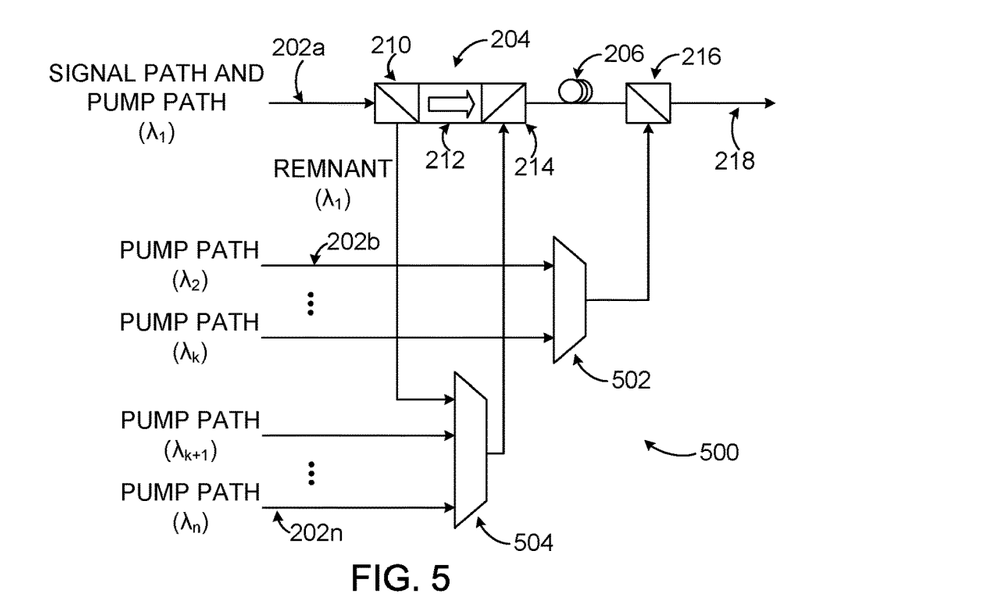

As shown in FIG. 5, a forward ROPA architecture 500 includes various components 202a-202n, 204, 206, 210, 212, 214, 216, 218 described above with respect to FIG. 2. The forward ROPA architecture 500 also implements the optical combiner/multiplexer unit 208 using two pump combiners 502 and 504. Each pump combiner 502 and 504 denotes any suitable pump combiner, multiplexer, or other structure(s) configured to combine pump powers. While each pump combiner 502 and 504 is shown as a single component in FIG. 5, each pump combiner 502 and 504 could be implemented using multiple devices to perform the desired combining function.

In this example, the pump combiner 504 receives the remnant of the pump power from the optical path 202a and pump powers from a subset of the remaining optical paths 202b-202n. The pump combiner 502 receives pump powers from another subset of the remaining optical paths 202b-202n. The pump combiner 502 feeds pump power(s) to the optical multiplexer 216, while the pump combiner 504 feeds pump power(s) to the optical multiplexer 214.

As can be seen here, FIGS. 4 and 5 indicate that different pump powers from different optical paths 202b-202n can be combined in different ways and provided to the optical multiplexers 214 and 216. FIGS. 4 and 5 also indicate that the remnant of the pump power from the optical path 202a can be provided to either of the optical multiplexers 214 and 216. In this way, the ROPA architectures 400 and 500 support both wavelength and spatial multiplexing of the pump powers.

It should be noted that the multiplexers and the connections to the multiplexers in FIGS. 4 and 5 are for illustration only and that at least three pump powers can be combined and provided to multiple locations within a forward ROPA in any other suitable manner. For example, assume only three pump powers $\lambda_1$, $\lambda_2$, and $\lambda_3$ are received in FIG. 4. In such a case, the pump combiner 404 could be omitted, the pump power $\lambda_3$ could be provided directly to the optical multiplexer 214, and the pump combiner 402 could be used to combine the remnant of the pump power $\lambda_1$ and the pump power $\lambda_2$ and provide the resulting power to the optical multiplexer 216. In other words, there are a wide variety of ways in which at least some of three or more optical pump powers can be combined (wavelength multiplexed) and provided to different locations (spatially multiplexed).

Figure 6:
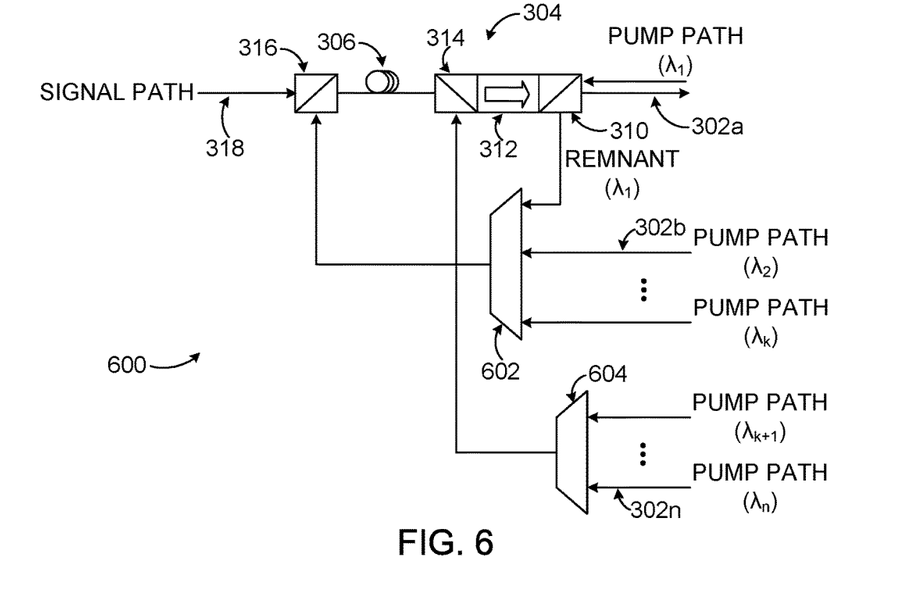

As shown in FIG. 6, a backward ROPA architecture 600 includes various components 302a-302n, 304, 306, 310, 312, 314, 316, 318 described above with respect to FIG. 3. The backward ROPA architecture 600 also implements the optical combiner/multiplexer unit 308 using two pump combiners 602 and 604. Each pump combiner 602 and 604 denotes any suitable pump combiner, multiplexer, or other structure(s) configured to combine pump powers. While each pump combiner 602 and 604 is shown as a single component in FIG. 6, each pump combiner 602 and 604 could be implemented using multiple devices to perform the desired combining function.

In this example, the pump combiner 602 receives the remnant of the pump power from the optical path 302a and pump powers from a subset of the remaining optical paths 302b-302n. The pump combiner 604 receives pump powers from another subset of the remaining optical paths 302b-302n. The pump combiner 604 feeds pump power(s) to the optical multiplexer 314, while the pump combiner 602 feeds pump power(s) to the optical multiplexer 316.

Figure 7:
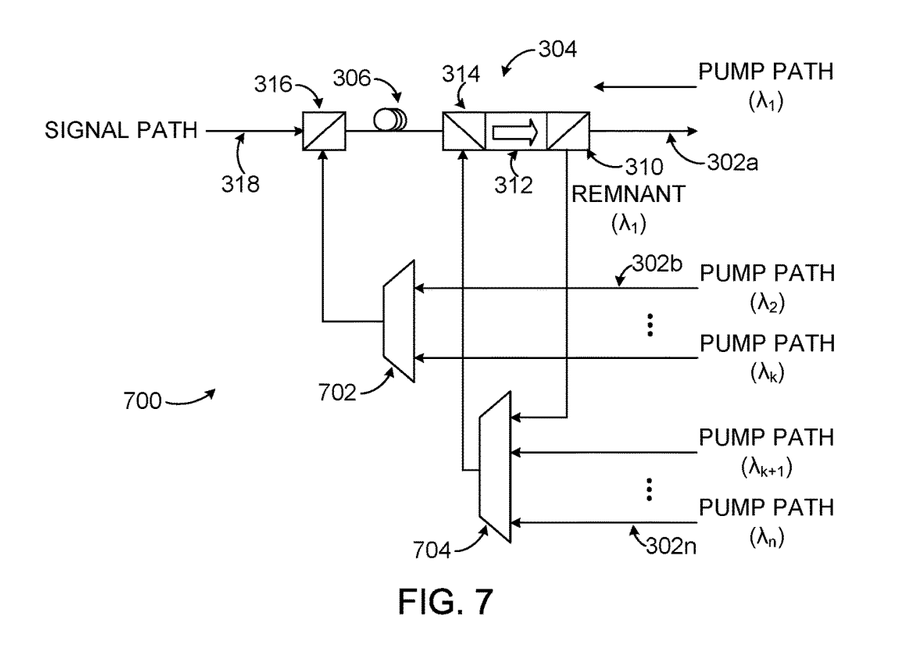

As shown in FIG. 7, a backward ROPA architecture 700 includes various components 302a-302n, 304, 306, 310, 312, 314, 316, 318 described above with respect to FIG. 3. The backward ROPA architecture 700 also implements the optical combiner/multiplexer unit 308 using two pump combiners 702 and 704. Each pump combiner 702 and 704 denotes any suitable pump combiner, multiplexer, or other structure(s) configured to combine pump powers. While each pump combiner 702 and 704 is shown as a single component in FIG. 7, each pump combiner 702 and 704 could be implemented using multiple devices to perform the desired combining function.

In this example, the pump combiner 704 receives the remnant of the pump power from the optical path 302a and pump powers from a subset of the remaining optical paths 302b-302n. The pump combiner 702 receives pump powers from another subset of the remaining optical paths 302b-302n. The pump combiner 702 feeds pump power(s) to the optical multiplexer 316, while the pump combiner 704 feeds pump power(s) to the optical multiplexer 314.

As can be seen here, FIGS. 6 and 7 indicate that different pump powers from different optical paths 302b-302n can be combined in different ways and provided to the optical multiplexers 314 and 316. FIGS. 6 and 7 also indicate that the remnant of the pump power from the optical path 302a can be provided to either of the optical multiplexers 314 and 316. In this way, the ROPA architectures 600 and 700 support both wavelength and spatial multiplexing of the pump powers.

Again, it should be noted that the multiplexers and the connections to the multiplexers in FIGS. 6 and 7 are for illustration only and that at least three pump powers can be combined and provided to multiple locations within a backward ROPA in any other suitable manner. There are a wide variety of ways in which at least some of three or more optical pump powers can be combined (wavelength multiplexed) and provided to different locations (spatially multiplexed).

Although FIGS. 4 through 7 illustrate specific examples of architectures of ROPAs for use in optical transmission systems, various changes may be made to FIGS. 4 through 7. For example, the numbers of optical paths carrying pump powers can vary as needed or desired. Also, the numbers of inputs and outputs of the various optical combiner/multiplexer units can vary as needed or desired.

Figure 8:
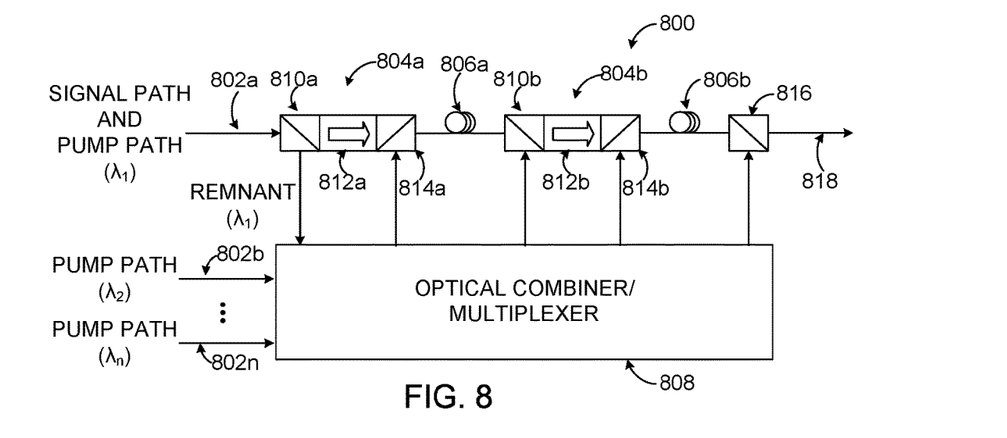
FIGS. 8 and 9 illustrate example multi-stage architectures of ROPAs for use in optical transmission systems according to this disclosure.
Figure 9:
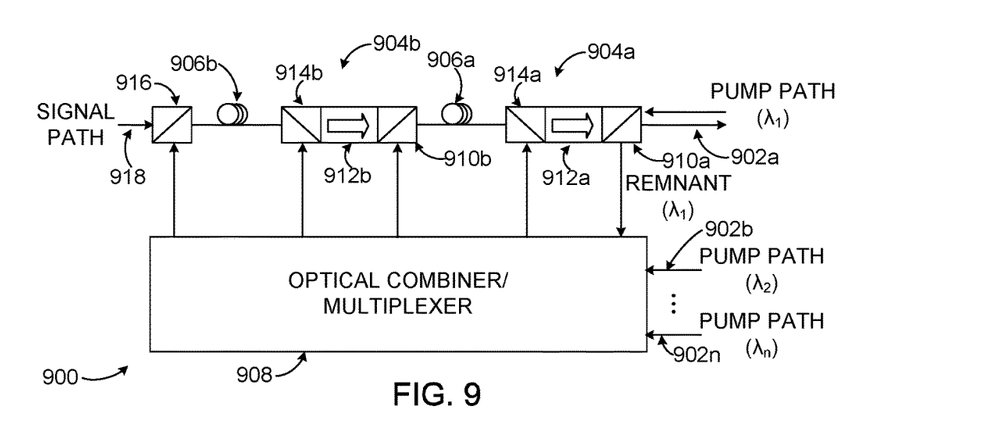

FIGS. 8 and 9 illustrate example multi-stage architectures of ROPAs for use in optical transmission systems according to this disclosure. For ease of explanation, the ROPA architectures in FIGS. 8 and 9 may be described as operating in the optical transmission system 100 of FIG. 1. However, these ROPA architectures could be used in any other suitable system.

As shown in FIG. 8, a forward ROPA architecture 800 includes optical paths 802a-802n, which may be the same as or similar to the optical paths 202a-202n in FIG. 2. The ROPA architecture 800 also includes multiple amplification stages formed by bypass hybrid filters 804a-804b and fiber amplifiers 806a-806b. Each of the bypass hybrid filters 804a-804b could be the same as or similar to the bypass hybrid filter 204 in FIG. 2, and each of the fiber amplifiers 806a-806b could be the same as or similar to the fiber amplifier 206 in FIG. 2. Each of the bypass hybrid filters 804a-804b includes an optical demultiplexer 810a-801b, an optical isolator 812a-812b, and an optical multiplexer 814a-814b, which could be the same as or similar to the corresponding components 210, 212, 214 in FIG. 2. An additional optical multiplexer 816 follows the second stage of amplification in FIG. 8 and generates output signals on an optical path 818.

An optical combiner/multiplexer unit 808 operates to redirect and selectively combine the pump powers from the optical paths 802a-802n and to provide the pump powers to the optical multiplexers 814a, 814b, and 816 and to the optical demultiplexer 810b. The optical combiner/multiplexer unit 808 provides both wavelength and spatial multiplexing of the pump powers in this manner. The optical combiner/multiplexer unit 808 can be coupled to each of the components 810b, 814a, 814b, and 816 via an optical fiber.

Each of the locations where the optical combiner/multiplexer unit 808 can provide pump powers (to the components 810b, 814a, 814b, and 816 in this example) may be referred to as a port. The optical combiner/multiplexer unit 808 therefore provides spatial and wavelength multiplexing between its three input optical fibers and the four ports. In some embodiments, two or four of the ports could receive pump powers from the optical combiner/multiplexer unit 808. If only two of the ports receive pump powers, the optical combiner/multiplexer unit 808 could create a bypass between the optical demultiplexer 810b and the optical multiplexer 814b so that pump powers are supplied only to the optical multiplexers 814a and 816. If four of the ports receive pump powers from the optical combiner/multiplexer unit 808, the optical combiner/multiplexer unit 808 can provide any suitable combinations of pump powers to the optical multiplexers 814a, 814b, and 816 and the optical demultiplexer 810b.

As shown in FIG. 9, a backward ROPA architecture 900 includes optical paths 902a-902n, which may be the same as or similar to the optical paths 302a-302n in FIG. 3. The ROPA architecture 900 also includes multiple amplification stages formed by bypass hybrid filters 904a-904b and fiber amplifiers 906a-906b. Each of the bypass hybrid filters 904a-904b could be the same as or similar to the bypass hybrid filter 304 in FIG. 3, and each of the fiber amplifiers 906a-906b could be the same as or similar to the fiber amplifier 306 in FIG. 3. Each of the bypass hybrid filters 904a-904b includes an optical demultiplexer 910a-901b, an optical isolator 912a-912b, and an optical multiplexer 914a-914b, which could be the same as or similar to the corresponding components 310, 312, 314 in FIG. 3. An additional optical multiplexer 916 precedes the amplification stages in FIG. 9 and receives optical signals on an optical path 918.

An optical combiner/multiplexer unit 908 operates to redirect and selectively combine the pump powers from the optical paths 902a-902n and to provide the pump powers to the optical multiplexers 914a, 914b, and 916 and to the optical demultiplexer 910b. The optical combiner/multiplexer unit 908 provides both wavelength and spatial multiplexing of the pump powers in this manner. The optical combiner/multiplexer unit 908 can be coupled to each of the components 910b, 914a, 914b, and 916 via an optical fiber.

Each of the locations where the optical combiner/multiplexer unit 908 can provide pump powers (to the components 910b, 914a, 914b, and 916 in this example) may be referred to as a port. The optical combiner/multiplexer unit 908 therefore provides spatial and wavelength multiplexing between its three input optical fibers and the four ports. In some embodiments, two or four of the ports could receive pump powers from the optical combiner/multiplexer unit 908. If only two of the ports receive pump powers, the optical combiner/multiplexer unit 908 could create a bypass between the optical demultiplexer 910b and the optical multiplexer 914b so that pump powers are supplied only to the optical multiplexers 914a and 916. If four of the ports receive pump powers from the optical combiner/multiplexer unit 908, the optical combiner/multiplexer unit 908 can provide any suitable combinations of pump powers to the optical multiplexers 914a, 914b, and 916 and the optical demultiplexer 910b.

As can be seen here, the ability to duplicate the amplification stages in a ROPA increases the number of locations where pump powers can be injected into the ROPA. As a result, this approach provides greater flexibility is allowing pump powers to be combined and used to amplify optical signals in the ROPA.

Although FIGS. 8 and 9 illustrate examples of multi-stage architectures 800 and 900 of ROPAs for use in optical transmission systems, various changes may be made to FIGS. 8 and 9. For example, each ROPA could include more than two amplification stages. Also, the numbers of optical paths carrying pump powers can vary as needed or desired. In addition, the numbers of inputs and outputs of the various optical combiner/multiplexer units can vary as needed or desired.

Figure 10:
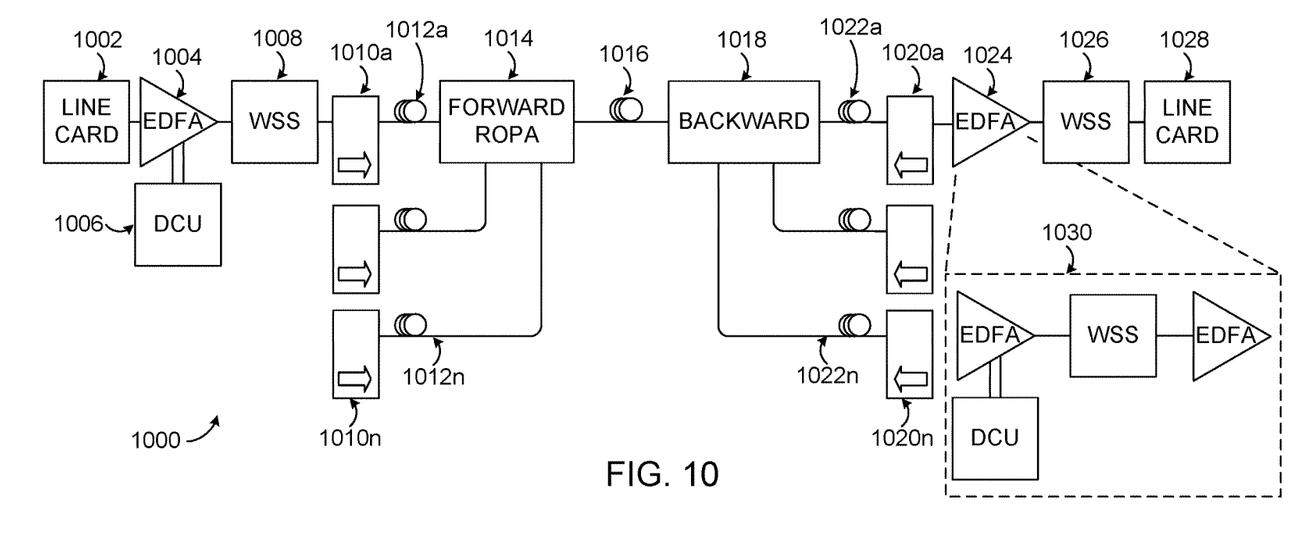
FIGS. 10 through 12 illustrate a specific example of an optical transmission system and related ROPAs according to this disclosure.
Figure 11:
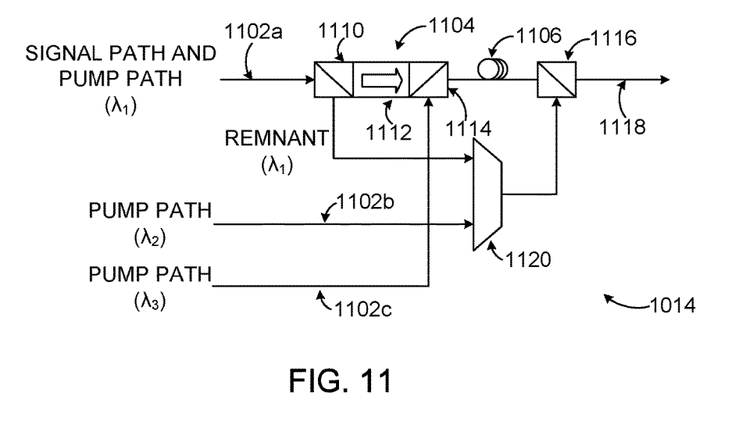
Figure 12:
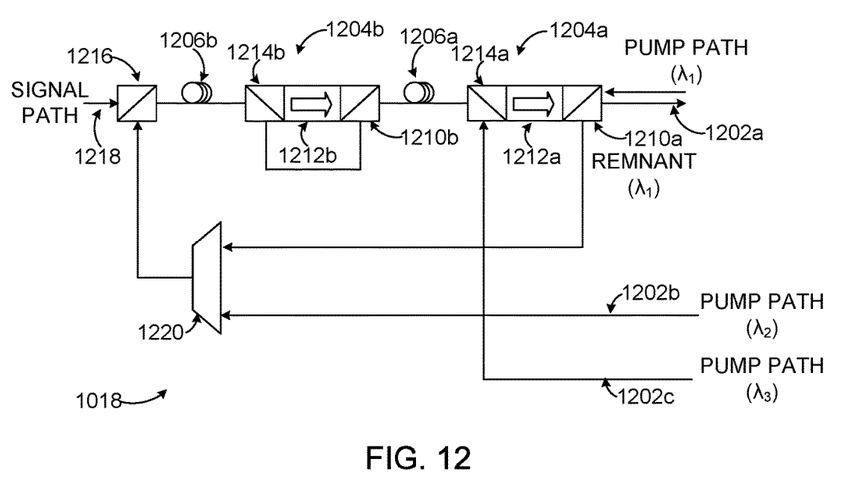

FIGS. 10 through 12 illustrate a specific example of an optical transmission system 1000 and related ROPAs according to this disclosure. The optical transmission system 1000 in this example denotes an ultra-long unrepeatered system that can achieve transmissions over 600 kilometers at 10 gigabits per second (10 G) or 100 gigabits per second (100 G). While the optical transmission system 1000 shown in FIG. 10 is a unidirectional link, the same structure could be replicated to create a bi-directional link or multiple bi-directional links.

As shown in FIG. 10, a line card 1002 denotes an optical transmitter, such as a 10 G or 100 G line card. An Erbium-doped fiber amplifier (EDFA) 1004 amplifies the optical signals from the line card 1002, and a Dispersion Compensation Unit (DCU) 1006 is used with the EDFA 1004. A Wavelength Selective Switch (WSS) 1008 follows the EDFA 1004. Pump sources 1010a-1010n generate pump powers, which are provided over optical fibers 1012a-1012n to a forward ROPA 1014. An optical fiber 1016 couples the forward ROPA 1014 to a backward ROPA 1018. Pump sources 1020a-1020n generate pump powers, which are provided over optical fibers 1022a-1022n to the backward ROPA 1016. An EDFA 1024 amplifies optical signals from the backward ROPA 1016, and a WSS 1026 follows the EDFA 1024. A line card 1028 denotes an optical receiver, such as a 10 G or 100 G line card.

A particular implementation of the system 1000 can have the following characteristics, although these details are for illustration only. The line card 1002 can be configured to transmit 100 G at 1563.86 nm or 10 G at 1563.05 nm. A 100 G signal can be NRZ-PM-QPSK modulated at 120 gigabits per second, which accounts for a 15% overhead for a Soft-Decision Forward Error Correction (SD-FEC) code. The SD-FEC can correct a bit error rate (BER) of $1.9 \times 10^{-2}$ to less than $10^{-15}$ (NCG of 11.1 dB). A 10 G channel can operate at 12.5 gigabits per second, which includes a 25% overhead for an Ultra FEC (FEC threshold is $9.5 \times 10^{-3}$). The optical signal is amplified through a double-stage EDFA 1004 with a mid-stage DCU 1006, followed by a WSS 1008 (such as a 100 GHz WSS) to filter out amplified spontaneous emission (ASE) from the transmit EDFA 1004. At the receive end, an EDFA 1024 amplifies the received signal, and another WSS 1026 is used to demultiplex the channels. For 10 G operation, the components within a box 1030 (two EDFAs and multiple DCUs) can be used in place of the EDFA 1024 to provide optical dispersion compensation. At the transmit side, approximately $-1,600$ ps/nm of dispersion pre-compensation can be placed in the mid-stage of the EDFA 1004 to improve transmission performance for both 100 G and 10 G transmissions. Approximately $-11,000$ ps/nm dispersion post-compensation at the receiver side can be used for 10 G transmissions.

The span formed by the optical fiber 1016 can be assembled with CORNING VASCADE EX2000 optical fiber. The EX2000 fiber is a G.654B fiber (a cutoff-shifted single-mode fiber with a cutoff wavelength ≤1530 nm) with a chromatic dispersion of ≤20.2 ps/nm-km and a large $A_{err}$ of 112 μm², enabling high optical launch powers into the fiber.

In the signal path, the forward ROPA 1014 and the backward ROPA 1018 are located at 128.0 km and 151.4 km, respectively, from the end-points or terminals. For 100 G transmissions, the distance between the ROPAs can be adjusted to 327.6 km for a total span length of 607.0 km and a span loss of 97.2 dB (losses of the ROPAs not included), resulting in an average fiber loss of 0.160 dB/km (including splices and connectors). For 10 G transmissions, the total distance can be increased to 632.0 km (352.6 km between ROPAs) for a span loss of 101.0 dB.

For the dedicated pump paths, fiber lengths of 128.2 km and 128.7 km can be used in pump paths for the forward ROPA, and fiber lengths of 154.2 km and 151.7 km can be used in pump paths for the backward ROPA. Distributed Raman pumps can use a common commercial Raman pump module (NU-WAVE OPTIMA SE24), each of which supports five pump wavelengths distributed in the range between 1420 nm and 1500 nm. However, the Raman pump modules in the signal path may not use the pump at the longest wavelength, so those pump modules operate with four pump wavelengths in the range between 1420 and 1480 nm. Turning off the longest pump wavelength (with less "walkoff" between pump and signal in a dispersive fiber) helps to reduce the relative intensity noise (RIN) transfer penalty in the forward direction and provides more efficient Raman gain to the signal wavelength around 1563 nm. The pump modules in the pump paths can use all five pump wavelengths. Due to the Raman interaction between the pump wavelengths along the fiber, the longest wavelength in both the forward and backward pump modules can have the highest power at the ROPA and can primarily be used to excite the Erbium fibers.

FIG. 11 illustrates one example implementation of the forward ROPA 1014 in the system 1000 of FIG. 10. As shown in FIG. 11, the forward ROPA 1014 includes optical paths 1102a-1102c, a bypass hybrid filter 1104, and a fiber amplifier 1106 (such as a 20 m Erbium fiber). The bypass hybrid filter 1104 includes an optical demultiplexer 1110, an optical isolator 1112, and an optical multiplexer 1114. There is an additional optical multiplexer 1116 following the fiber amplifier 1106, which generates output signals on an optical path 1118. An optical combiner/multiplexer unit here is implemented using the optical path 1102c and an optical multiplexer 1120. Pump power on the optical path 1102c is provided directly to the optical multiplexer 1114. Remnant pump power from the optical path 1102a and pump power on the optical path 1102b are provided to the optical multiplexer 1116 via the optical multiplexer 1120.

FIG. 12 illustrates one example implementation of the backward ROPA 1018 in the system 1000 of FIG. 10. As shown in FIG. 12, the backward ROPA 1018 includes optical paths 1202a-1202c and multiple amplification stages containing bypass hybrid filters 1204a-1204b and fiber amplifiers 1206a-1206b (such as 20 m Erbium fibers). Each of the bypass hybrid filters 1204a-1204b includes an optical demultiplexer 1210a-1210b, an optical isolator 1212a-1212b, and an optical multiplexer 1214a-1214b. There is an additional optical multiplexer 1216 preceding the fiber amplifier 1206b, which receives signals on an optical path 1218. An optical combiner/multiplexer unit here is implemented using the optical path 1202c and an optical multiplexer 1220. Pump power on the optical path 1202c is provided directly to the optical multiplexer 1214a. Remnant pump power from the optical path 1202a and pump power on the optical path 1202b are provided to the optical multiplexer 1216 via the optical multiplexer 1220. The optical demultiplexer 1210b and the optical multiplexer 1214b are tied together. The hybrid filter 1204b here splits the Erbium gain into two sections while allowing the fiber amplifiers to be excited from both directions, which can help to improve the noise figure (NF) of the backward ROPA 1018.

During operation, the signal power launched into the optical link 1012a can be −9.4 dBm for 100 G and −3.6 dBm for 10 G transmissions. The same distributed Raman pump powers can be used for both 100 G and 10 G transmissions, such as 1860 mW in the signal path and 2060 mW in the pump paths (the same pump powers can be used for both forward and backward pumping). The pump power reaching the EDF in the forward ROPA can be 5.2 mW from the signal path and 8.7 mW and 8.2 mW for the two pump paths. The forward ROPA gain can be 18.8 dB for 100 G and 13.2 dB for 10 G. At the backward ROPA, the pump power reaching the EDF can be 1.7 mW, 3.3 mW, and 2.4 mW from the signal path and the two pump paths. The backward ROPA gain could be 25.4 dB gain at 100 G and 26.2 dB at 10 G. The maximum power of the signal right after the forward ROPA at 128 km could be +11.9 dBm for 100 G and +12.2 dBm for 10 G. The measured OSNR at the receiver could be 13.7 dB (0.1 nm) for 100 G and 10.0 dB (0.1 nm) for 10 G, which is in good agreement with simulations (13.6 dB, 10.1 dB).

Using this arrangement, the average pre-FEC BER over the duration of a 45-hour BER stability test at 100 G transmission could be $1.18 \times 10^{-2}$ (corresponding to a Q of 7.1 dB) with less than 0.3 dBQ fluctuation and no uncorrected errors after SD-FEC. The total signal propagation penalty (which includes nonlinear, RIN, and MPI penalties) could be estimated to be 0.6 dB in Q compared to back-to-back performance (Q of 7.7 dB at 13.7 dB OSNR). A 30-hour stability test at 100 G unrepeatered transmission could have an average pre-FEC BER of $7.80 \times 10^{-3}$ (corresponding to a Q of 7.8 dB) with less than 0.2 dBQ fluctuation and no uncorrected errors after Ultra FEC.

Although FIGS. 10 through 12 illustrate one specific example of an optical transmission system 1000 and related ROPAs 1014 and 1018, various changes may be made to FIGS. 10 through 12. For example, specific details provided above, such as specific distances, structures, and performance values, relate to a particular implementation of the system 1000. Any other suitable distances, structures, performance values, and other features could be used in the system 1000. As particular examples, each of the ROPAs 1014 and 1018 in the system 1000 could be implemented in any other ways described above.

Figure 13:
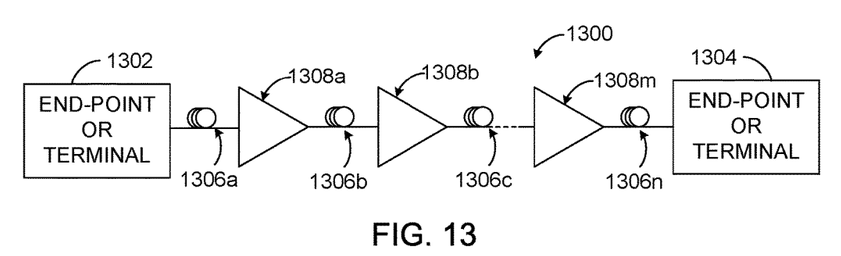
FIG. 13 illustrates an example multi-span optical transmission system according to this disclosure.

FIG. 13 illustrates an example multi-span optical transmission system 1300 according to this disclosure. As shown in FIG. 13, the optical transmission system 1300 includes end-points or terminals 1302 and 1304, which could be the same as or similar to the end-points or terminals 102 and 104. The end-points or terminals 1302 and 1304 are coupled by an optical communication link that includes multiple spans 1306a-1306n of optical fibers and multiple ROPAs 1308a-1308m positioned in-line with the multiple spans 1306a-1306n.

One or more of the ROPAs 1308a-1308m could be implemented using any of the ROPA designs described above and use at least three pump powers that are wavelength and spatially multiplexed. For example, the ROPA 1308a closest to the end-point or terminal 1302 could receive and multiplex at least three pump powers from the end-point or terminal 1302, and/or the ROPA 1308m closest to the end-point or terminal 1304 could receive and multiplex at least three pump powers from the end-point or terminal 1304. The other ROPAs between the ROPA 1308a and the ROPA 1308m could denote conventional ROPAs or could denote any of the ROPA designs described above (in which case each of those ROPAs would receive and multiplex at least three pump powers, such as from the closest end-point or terminal).

Although FIG. 13 illustrates one example of a multi-span optical transmission system 1300, various changes may be made to FIG. 13. For example, the spans 1306a-1306n and ROPAs 1308a-1308m here form a unidirectional link from the end-point or terminal 1302 to the end-point or terminal 1304. The same or similar structure could be replicated and reversed to form a unidirectional link from the end-point or terminal 1304 to the end-point or terminal 1302, thereby forming a fiber pair. Multiple fiber pairs could also be used between the end-points or terminals 1302 and 1304.

Figure 14:
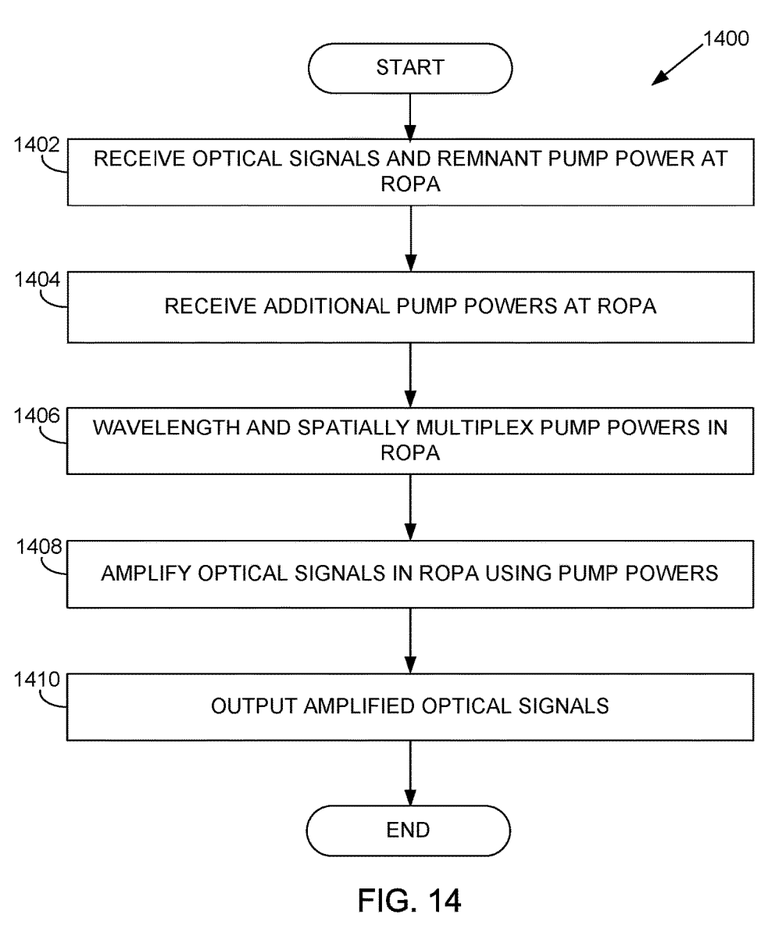
FIG. 14 illustrates an example method for operating a ROPA in an optical transmission system according to this disclosure.

FIG. 14 illustrates an example method 1400 for operating a ROPA in an optical transmission system according to this disclosure. For ease of explanation, the method 1400 in FIG. 14 is described as being used in the optical transmission system 100 of FIG. 1 using the ROPA architectures 200 and 300 of FIGS. 2 and 3. However, the method 1400 could be used in any other suitable system and with any other suitable ROPA architectures, including the other systems and ROPA architectures described above.

As shown in FIG. 14, optical signals and remnant pump power are received at a ROPA at step 1402. This could include, for example, a forward ROPA 110 or 130 receiving optical signals and a remnant of first pump power over the same optical fiber 114*a* or 134*a*. This could also include a backward ROPA 112 or 132 receiving optical signals over one optical fiber 120 or 140 and a remnant of first pump power over another optical fiber 122*a* or 142*a*.

Additional pump powers are received at the ROPA at step 1404. This could include, for example, the ROPA 110, 112, 130, 132 receiving at least second and third pump powers over additional optical fibers 114*b*-114*n*, 122*b*-122*n*, 134*b*-134*n*, 142*b*-142*n*. In some embodiments, the ROPA receives two additional pump powers over two additional optical fibers.

The pump powers are wavelength and spatially multiplexed at step 1406. This could include, for example, an optical combiner/multiplexer unit 208 or 308 in the ROPA 110, 112, 130, 132 combining at least two of the pump powers and supplying different pump powers to different locations within the ROPA 110, 112, 130, 132. As described above, at least one of the pump powers could be provided directly to an optical multiplexer (without combination), while other pump powers could be combined prior to be provided to an optical multiplexer. However, any other suitable wavelength and spatial multiplexing could be used.

The optical signals are amplified in the ROPA using the pump powers at step 1408. This could include, for example, one or more fiber amplifiers in one or more amplification stages of the ROPA 110, 112, 130, 132 amplifying the optical signals. The fiber amplifiers can receive pump powers in the forward direction and/or the backward direction depending on how the pump powers are spatially multiplexed in the ROPA.

The amplified optical signals are output at step 1410. This could include, for example, the forward ROPA 110 or 130 outputting the amplified optical signals over the optical fiber 120 or 140. This could also include the backward ROPA 112 or 132 outputting the amplified optical signals over the optical fiber 122*a* or 142*a*.

Although FIG. 14 illustrates one example of a method 1400 for operating a ROPA in an optical transmission system, various changes may be made to FIG. 14. For example, while shown as a series of steps, various steps in FIG. 14 could overlap, occur in parallel, occur in a different order, or occur any number of times.

Note that any suitable control mechanism could be used to control the wavelength and spatial multiplexing provided in a ROPA. The wavelength and spatial multiplexing could be set to have a specific configuration (which may or may not change over time), or the wavelength and spatial multiplexing could routinely or repeatedly change in order to accommodate changing conditions within an optical transmission system. If the wavelength and spatial multiplexing can change over time, a computing device or other control mechanism could use any suitable control logic for controlling the wavelength and spatial multiplexing in order to obtain desirable amplification results using the ROPA.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of the invention as defined by the following claims.

What is claimed is:

1. An apparatus comprising:
    a remote optically pumped amplifier (ROPA) comprising:
        a bypass filter configured to receive and separate an optical signal and first pump power;
        an amplifier configured to amplify the optical signal; and
        an optical combiner/multiplexer configured to (i) receive multiple pump powers including the first pump power and (ii) provide different combinations of pump powers to different locations within the ROPA to feed the amplifier in opposite directions.

2. The apparatus of claim 1, wherein:
the bypass filter comprises a first optical multiplexer optically coupled to a first side of the amplifier, the first optical multiplexer configured to feed a first combination of pump powers to the amplifier in a first direction; and
the ROPA further comprises a second optical multiplexer optically coupled to a second side of the amplifier, the second optical multiplexer configured to feed a second combination of pump powers to the amplifier in a second direction, the first and second directions representing the opposite directions.

3. The apparatus of claim 2, wherein the optical combiner/multiplexer is configured to provide at least one of the pump powers to one of the optical multiplexers without combination with any other pump powers.

4. The apparatus of claim 1, wherein the optical combiner/multiplexer is configured to wavelength multiplex and spatially multiplex the pump powers.

5. The apparatus of claim 1, wherein the bypass filter comprises:
an optical demultiplexer configured to separate the optical signal and the first pump power;
an optical multiplexer configured to combine the optical signal and one of the combinations of pump powers, the optical multiplexer optically coupled to the amplifier; and
an optical isolator configured to isolate the first pump power from the optical multiplexer.

6. The apparatus of claim 1, wherein the optical combiner/multiplexer comprises multiple pump combiners each configured to combine at least two of the pump powers.

7. The apparatus of claim 1, wherein the ROPA comprises a forward ROPA configured to receive the optical signal and the first pump power over a common optical fiber.

8. The apparatus of claim 1, wherein the ROPA comprises a backward ROPA configured to receive the optical signal over a first optical fiber and to receive the first pump power over a second optical fiber.

9. The apparatus of claim 1, wherein:
the ROPA comprises a multi-stage ROPA;
one stage of the multi-stage ROPA comprises the bypass filter and the amplifier; and
at least one additional stage of the multi-stage ROPA comprises at least one additional bypass filter and at least one additional amplifier.

10. The apparatus of claim 1, wherein the ROPA is configured to receive all of the multiple pump powers from remote sources over optical fibers.

11. A system comprising:
an optical communication link comprising a remote optically pumped amplifier ROPA), the ROPA comprising:
a bypass filter configured to receive and separate an optical signal and first pump power;
an amplifier configured to amplify the optical signal; and
an optical combiner/multiplexer configured to (i) receive multiple pump powers including the first pump power and (ii) provide different combinations of pump powers to different locations within the ROPA to feed the amplifier in opposite directions.

12. The system of claim 11, wherein:
the bypass filter comprises a first optical multiplexer optically coupled to a first side of the amplifier, the first optical multiplexer configured to feed a first combination of pump powers to the amplifier in a first direction; and
the ROPA further comprises a second optical multiplexer optically coupled to a second side of the amplifier, the second optical multiplexer configured to feed a second combination of pump powers to the amplifier in a second direction, the first and second directions representing the opposite directions.

13. The system of claim 11, wherein the optical combiner/multiplexer is configured to wavelength multiplex and spatially multiplex the pump powers.

14. The system of claim 11, wherein the bypass filter comprises:
an optical demultiplexer configured to separate the optical signal and the first pump power;
an optical multiplexer configured to combine the optical signal and at least one of the combinations of pump powers, the optical multiplexer optically coupled to the amplifier; and
an optical isolator configured to isolate the first pump power from the optical multiplexer.

15. The system of claim 11, wherein:
the ROPA comprises a backward ROPA; and
the optical communication link further comprises a forward ROPA and an optical fiber coupling the forward ROPA and the backward ROPA.

16. The system of claim 15, wherein the optical communication link comprises one of a pair of optical communication links, another of the optical communication links comprising another forward ROPA and another backward ROPA.

17. A method comprising:
receiving an optical signal and multiple pump powers including a first pump power at a remote optically pumped amplifier (ROPA);
providing the optical signal to an amplifier of the ROPA for amplification; and
providing different combinations of pump powers to different locations within the ROPA to feed the amplifier in opposite directions.

18. The method of claim 17, wherein the first pump power represents a remnant of pump power used for Raman amplification of the optical signal.

19. The method of claim 17, wherein providing different combinations of pump powers to different locations within the ROPA comprises:
feeding a first combination of pump powers to the amplifier in a first direction; and
feeding a second combination of pump powers to the amplifier in a second direction, the first and second directions representing the opposite directions.

20. The method of claim 17, wherein providing different combinations of pump powers to different locations within the ROPA comprises wavelength multiplexing and spatially multiplexing the pump powers.

21. The method of claim 17, wherein the ROPA comprises a ROPA in a multi-span optical communication link.

* * * * *